US007757547B2

(12) United States Patent
Kageyama et al.

(10) Patent No.: US 7,757,547 B2
(45) Date of Patent: Jul. 20, 2010

(54) CYLINDER STROKE POSITION MEASUREMENT DEVICE

(75) Inventors: Masato Kageyama, Tochigi (JP); Nobuyuki Nagahashi, Fukushima (JP)

(73) Assignee: Komatsu Ltd., Tokyo (JP)

( * ) Notice: Subject to any disclaimer, the term of this patent is extended or adjusted under 35 U.S.C. 154(b) by 71 days.

(21) Appl. No.: 12/227,399

(22) PCT Filed: Jun. 13, 2007

(86) PCT No.: PCT/JP2007/061890

§ 371 (c)(1),
(2), (4) Date: Nov. 17, 2008

(87) PCT Pub. No.: WO2007/145243

PCT Pub. Date: Dec. 21, 2007

(65) Prior Publication Data

US 2009/0139316 A1 Jun. 4, 2009

(30) Foreign Application Priority Data

Jun. 16, 2006 (JP) ............................ 2006-167367

(51) Int. Cl.
*G01M 15/00* (2006.01)

(52) U.S. Cl. ................................ 73/114.26; 73/114.27

(58) Field of Classification Search .. 73/114.26–114.28
See application file for complete search history.

(56) References Cited

U.S. PATENT DOCUMENTS

| | | | | | |
|---|---|---|---|---|---|
| 4,793,241 | A | * | 12/1988 | Mano et al. | 92/5 R |
| 5,138,934 | A | * | 8/1992 | Murayama et al. | 92/5 R |
| 5,293,776 | A | * | 3/1994 | Takegami et al. | 73/114.27 |
| 5,455,509 | A | * | 10/1995 | Semura et al. | 324/207.24 |
| 5,541,506 | A | * | 7/1996 | Kawakita et al. | 324/207.2 |
| 6,679,107 | B1 | * | 1/2004 | Ono et al. | 73/114.63 |
| 7,162,947 | B2 | * | 1/2007 | Kucher et al. | 92/5 R |

FOREIGN PATENT DOCUMENTS

| | | |
|---|---|---|
| JP | U-59-045505 | 3/1984 |
| JP | B1-2957570 | 7/1999 |
| JP | A-11-280711 | 10/1999 |
| JP | A-2000-234603 | 8/2000 |

* cited by examiner

*Primary Examiner*—Lisa M Caputo
*Assistant Examiner*—Freddie Kirkland, III
(74) *Attorney, Agent, or Firm*—Oliff & Berridge, PLC

(57) ABSTRACT

A cylinder stroke position measurement device for enabling common use of a rotation sensor unit in measurement of a cylinder stroke position by detecting an amount of rotation of a rotary roller by means of a rotation sensor. A cylinder is provided at its head portion with a base member 300 having an opening accommodating at least a rotary roller and a rotation sensor section. A pressing member, the rotary roller, and the rotation sensor section are held on one side of a sensor holding member, while a coupling member for example is provided on the opposite side of the sensor holding member, thus constituting a rotation sensor unit. The sensor holding member is attached to the base member such that the rotary roller and the rotation sensor section are accommodated in the opening of the base member 300. The rotary roller is pressed by the pressing member against the surface of a rod. The rotation sensor section detects an amount of rotation of the rotary roller. The coupling member electrically couples the rotation sensor section with an external signal line.

9 Claims, 12 Drawing Sheets

B-B

150: SENSOR HOLDING MEMBER
151: FIRST SIDE
152: SECOND SIDE
131: LEAF SPRING
110: ROTARY ROLLER
120: ROTATION SENSOR SECTION
190: LEVER MEMBER
140: COUPLING MEMBER
113: BEARING
111: ROTATING SHAFT
112: MAGNET

B-B

150: SENSOR HOLDING MEMBER
151: FIRST SIDE
152: SECOND SIDE
131: LEAF SPRING
110: ROTARY ROLLER
120: ROTATION SENSOR SECTION
190: LEVER MEMBER
140: COUPLING MEMBER
113: BEARING
111: ROTATING SHAFT
112: MAGNET

CYLINDER STROKE POSITION MEASUREMENT DEVICE

TECHNICAL FIELD

The present invention relates to a cylinder stroke position measurement device and, in particular, to a device for measuring a cylinder stroke position by detecting an amount of rotation of a rotary roller.

BACKGROUND ART

There are conventionally known devices for measuring a cylinder stroke position by detecting an amount of rotation of a rotary roller using a rotation sensor.

FIG. 1(A) conceptually shows a structure of a rotation sensor forming a cylinder stroke position measurement device.

As shown in FIG. 1(A), a rotating shaft 6000 is rotatably supported by a fixing member 2000 through a bearing or the like. A rotor 3000 is provided at one end of the rotation shaft 1000. The rotor 3000 has a magnet 4000 arranged thereon such that a magnetic flux density is periodically varied according to a rotational position of the rotor. A rotary roller 1000 is provided at the other end of the rotating shaft 6000 by means of a joint or the like. The rotary roller 1000 is arranged so as to be in contact with a surface of a piston rod 7000 sliding within a cylinder. The rotary roller 1000 is arranged so as to rotate according to translational movement of the rod 7000.

A magnetic sensor section 5000 is provided at a position opposing the rotor 3000 in the axial direction of the rotating shaft 6000. The magnetic sensor section 5000 detects a magnetic flux density generated by the magnet 4000 and outputs an electrical signal according to the magnetic flux density. The electrical signal detected by the magnetic sensor section 5000 is converted from the amount of rotation of the rotary roller 1000 into an amount of displacement of the rod 7000 by a processing unit downstream thereof.

The rotary roller 1000 of the rotation sensor as described above must be pressed against the rod surface by means of a pressing member in order to prevent slip between the rotary roller 1000 and the rod 7000.

Patent Document 1 mentioned below describes an invention in which a rotary roller is pressed against a cylinder rod by means of a spring.

FIGS. 1(B) and 1(C) show a structure of a rotation sensor described in the Patent Document 1.

As shown in FIGS. 1(B) and 1(C), a lid 7200 is provided on a cylinder outer tube 7100. The lid 7200 has a frame 7300 attached thereto. The frame 7300 has a lever 7400 rotatably attached thereto. The lever 7400 has a rotary roller 1000 rotatably attached thereto. The rotary roller 1000 is in contact with the surface of a rod 7000 so as to rotate in accordance with displacement of the rod 7000.

A spring 7500 is interposed between the rotary roller 1000 and the lid 7200 such that the spring 7500 presses the rotary roller 1000 against the surface of the rod 7000. Thus, a rotation sensor unit 9000 is constituted by the lid 7200, the frame 7300, the lever 7400, the rotary roller 1000, and the spring 7500.

The lid 7200 forms a part of the outer tube 7100. The lid 7200 is mounted on an opening of the outer tube 7100. As a result, the components forming the rotation sensor unit 9000 is accommodated between the outer tube 7100 and the rod 7000. The rotary roller 1000 is pressed against the rod surface by the spring force of the spring 7500.

Patent Document 2 mentioned below describes a stroke sensor for measuring a displacement position of a rod, in which a magnetic sensor is mounted on a cylinder head while magnetic scales are embedded in various parts in the axial direction of the rod, so that a magnetic field generated by the magnetic scales is detected by means of the magnetic sensor.

Patent Document 1: Japanese Patent No. 2957570

Patent Document 2: Japanese Patent Application Laid-Open No. 2000-234603

DISCLOSURE OF THE INVENTION

Problems to be Solved by the Invention

Hydraulic working machines such as a hydraulic shovel typically have a plurality of working devices mounted thereon, such as a boom, an arm, and a bucket, and a stroke sensor is provided in each of cylinders of these working devices. In most cases, each working device has a different cylinder size, and thus has a different rod diameter, an outer tube diameter and so on. Further, hydraulic working machines of different types or specifications have different sizes of cylinders according thereto, and thus have different diameters of rods and outer tubes according thereto.

According to the invention described in Patent Document 1, when the rod diameter or the outer tube diameter differs, the distance from the lid 7200 to the rod contact surface of the rotary roller 1000 as well as the shape (curvature) of the lid 7200 will also differ accordingly in the rotation sensor unit 9000. Therefore, a rotation sensor unit 9000 having a different size or a different lid shape must be prepared for each working device or for each type of hydraulic working machines. This means that the rotation sensor unit cannot be used in common.

The invention of the Patent Document 2 relates to a technique in which a stroke sensor is mounted on the cylinder head. This stroke sensor is a magnetic sensor which is not in contact with the rod, unlike a rotary roller which is in contact with the rod. This is the point where the invention described in the Patent Document 2 is different from the present invention which is based on the presence of a rotary roller.

The present invention has been made in view of such circumstances, and it is an object of the present invention to provide a rotation sensor unit usable in common in measurement of a stroke position of various cylinders by detecting an amount of rotation of a rotary roller by means of the rotation sensor.

Means for Solving the Problems

A first aspect of the invention relates to a cylinder stroke position measurement device for measuring a stroke position of a cylinder (200), the device being characterized by including:

a rotary roller (110) being in contact with a surface of a rod (202) of the cylinder (200) and rotating in accordance with displacement of the rod (202);

a pressing member (130) pressing the rotary roller (110) against the surface of the rod (202);

a rotation sensor section (120) detecting an amount of rotation of the rotary roller (110);

a coupling member (140) electrically coupling the rotation sensor section (120) with an external signal line (160);

a base member (300) attached to a head portion (200H) of the cylinder (200) and having an opening (300A) accommodating at least the rotary roller (110) and the rotation sensor section (120); and a sensor holding member (150) holding the pressing member, the rotary roller, and the rotation sensor section (120) on its one side (151), and attached to the base member (300) such that the rotary roller (110) and the rotation sensor section (120) are accommodated in the opening (300A) of the base member (300).

A second aspect of the invention, according to the first aspect of the invention, is characterized in that the coupling member (140) is arranged on an opposite side (152) of the sensor holding member (150), and the cylinder stroke position measurement device further comprises a lid member (170) which is attached to the sensor holding member (150) so as to cover the coupling member (140).

A third aspect of the invention, according to the first aspect of the invention, is characterized in that the pressing member is a leaf spring (131), and the leaf spring (131) is accommodated in a recess (150A) formed in the sensor holding member (150) such that the rotary roller (110) is pressed against the surface of the rod (202) in accordance with deflection of the leaf spring (131).

A fourth aspect of the invention, according to the first aspect of the invention, is characterized in that the base member (300) is provided with dust seals (180, 181) at different positions in the stroke direction of the rod (202) such that the rotary roller (110) is located between the dust seals (180, 181).

A fifth aspect of the invention, according to the first aspect of the invention, is characterized in that:

a lever member (190) is provided for rotatably supporting the rotary roller (110);

the opening (300A) of the base member (300) is formed with an oblique hole (301) extending from an extension side of the rod (202) to a retraction side of the rod (202), along the direction from the outer periphery to the inner periphery of the base member (300); and the lever member (190) is provided with an oblique part (191) corresponding to the oblique hole (301), the oblique part (191) of the lever member (190) being inserted into the oblique hole (301).

A sixth aspect of the invention, according to the first aspect of the invention, is characterized in that the pressing member is a coil spring (132), and the coil spring (132) is accommodated in a recess (150A) formed in the sensor holding member (150) such that the rotary roller (110) is pressed against the surface of the rod (202) in accordance with deflection of the coil spring (132).

The first aspect of the invention will be described with reference to FIGS. 2, 3(A) and 3(B).

In the first aspect of the invention, a cylinder 200 is provided at its head portion 200H with a base member 300 having an opening 300A accommodating at least a rotary roller 110 and a rotation sensor section 120. A pressing member 130, a rotary roller 110 and a rotation sensor section 120 are held on one side (first side) of a sensor holding member 150, while a coupling member 140 is provided on the opposite side (second side) of the sensor holding member 150, thus constituting a rotation sensor unit 100. In this regard, however, any desired members may be provided on the second side of the sensor holding member 150 according to the present invention. The sensor holding member 150 is attached to the base member 300 such that the rotary roller 110 and the rotation sensor section 120 are accommodated in the opening 300A of the base member 300. Thus, the rotary roller 110 is pressed by the pressing member 130 against the surface of a rod 202. The rotation sensor section 120 detects an amount of rotation of the rotary roller 110. The coupling member 140 electrically couples the rotation sensor section 120 with a sensor cable 160 serving as an external signal line.

The base member 300 is prepared for each size of the cylinder 200, specifically, for each diameter of the rod 202 and each diameter of the outer tube 203. However, the base member 300 is fabricated such that a distance L from the surface of the rod 202 to a mounting surface 302 of the base member 300 where the sensor holding member 150 is attached remains fixed regardless of the diameter of the rod 202 or the diameter of the outer tube 203. Since the distance L from the surface of the rod 202 to the mounting surface 302 of the base member 300 where the sensor holding member 150 is attached is fixed, the distance from the sensor holding member 150 of the rotation sensor unit 100 to the rod contact surface of the rotary roller 110 can be made fixed.

According to the present invention, therefore, any difference in the diameter of the rod or outer tube may be coped with by preparing a base member 300 according to such difference, and thus the rotation sensor unit 100 can be used in common. According to the present invention, the rotation sensor unit can be used in common for measuring a stroke position of a cylinder by detecting an amount of rotation of a rotary roller by means of a rotation sensor.

In the second aspect of the invention, a coupling member 140 is provided on the second side 152 of the sensor holding member 150 and a lid member 170 is attached to the sensor holding member 150 so as to cover the coupling member 140.

In the third aspect of the invention, a leaf spring 131 is used as the pressing member 130, and the leaf spring 131 is accommodated in the recess 150A formed in the sensor holding member 150 such that the rotary roller 110 is pressed against the surface of the rod 202 in accordance with deflection of the leaf spring 131.

In the fourth aspect of the invention, dust seals 180 and 181 are provided in the base member 300 at different positions in a stroke direction of the rod 202 such that the rotary roller 110 is located between the dust seals.

In the fifth aspect of the invention, a lever member 190 for rotatably supporting the rotary roller 110 is provided, and an oblique hole 301 is formed in the opening 300A of the base member 300 so as to extend from the extension side of the rod 202 to the retraction side thereof along the direction from the outer periphery to the inner periphery of the base member 300. The lever member 190 is provided with an oblique part 191 corresponding to the oblique hole 301. The oblique part 191 of the lever member 190 is inserted into the oblique hole 301.

Thus, according to the fifth aspect of the invention, the lever member 190 has the oblique part 191 with a shape corresponding to the oblique hole 301 in the opening 300A of the base member 300, and the oblique part 191 of the lever member 190 is inserted into the oblique hole 301 together with the rotary roller 110. This configuration makes it possible to locate the rotary roller 110 and the dust seal 180 as far as possible to the side where the rod 202 is retracted. The stroke range of the rod 202 is restricted by a position of the dust seal 180 (which coincides with a position of the rotary roller 110). The stroke range of the rod 202 can be made greater as the dust seal 180 is located further to the retraction side of the rod 202 (FIGS. 4(A), 4(B), 4(C) and 4(D), and FIG. 5 (comparative example)).

In the sixth aspect of the invention, the pressing member is provided by a coil spring 132. The coil spring 132 is accommodated in a recess 150A formed in the sensor holding member 150 such that the rotary roller 110 is pressed against the surface of the rod 202 in accordance with deflection of the coil spring 132.

BEST MODE FOR CARRYING OUT THE INVENTION

Exemplary embodiments of the present invention will be described with reference to the drawings.

First Exemplary Embodiment

FIG. 2 is a diagram showing a structure of a cylinder stroke position measurement device 1 according to a first exemplary embodiment as viewed in cross section of a cylinder rod. FIG. 3(A) is a diagram showing the same cylinder rod as viewed in longitudinal section thereof, while FIG. 3(B) is a diagram showing an external appearance of the cylinder.

As shown in FIG. 3(A), a piston (not shown) is slidably provided within an outer tube 203 of a cylinder 200. A rod 202 as an inner tube is attached to the piston. A base member 300 functioning a cylinder head member is mounted on a head portion 200H of the cylinder 200. The base member 300 is an indispensable member for the cylinder in order to slidably support the rod 202 and to prevent dust from entering the inside of the cylinder by means of a seal. Further, as described later, a rotation sensor unit 100 according to this exemplary embodiment is mounted on the base member 300.

The base member 300 is formed into an annular shape to surround the outer periphery of the rod 202. The base member 300 is provided with an opening 300A for accommodating the rotation sensor unit 100. A threaded portion 303 is formed on the outer peripheral surface of the base member 300. The threaded portion 303 of the base member 300 is engaged with a threaded portion on the inner side of the outer tube 203 whereby the base member 300 is mounted to the head portion 200H of the cylinder 200. Oil seals 380, 381 formed into an annular shape are provided between the outer peripheral surface of the base member 300 and the inner peripheral surface of the outer tube 203.

The rod 202 is slidably provided to the base member 300. A cylinder-head-side oil chamber 204 is formed by a chamber defined by the base member 300, the piston 201 and the inner wall of the outer tube 203. Dust seals 180 and 181 and a rod seal 182 are provided on the inner peripheral surface of the base member 300 to seal the gap between the base member 300 and the rod 202 and to prevent contaminants such as dust from entering the cylinder-head-side oil chamber 204. Further, a guide member 183 for guiding the rod 202 is provided on the inner peripheral surface of the base member 300.

A hydraulic port (not shown) is formed in the outer tube 203 of the cylinder 200. Pressurized oil is supplied to the cylinder-head-side oil chamber 204 through the hydraulic port, or discharged from the oil chamber through the hydraulic port (not shown). The supply of the pressurized oil to the cylinder-head-side oil chamber 204 retracts the rod 202, whereas the discharge of the pressurized oil from the cylinder-head-side oil chamber 204 extends the rod 202. In this manner, the rod 202 is translationally displaced in a transverse direction as viewed in FIGS. 3(A) and 3(B).

FIGS. 7(A) and 7(B) are perspective views of an external appearance of the rotation sensor unit 100 as viewed from different directions.

As seen by referring FIGS. 7(A) and 7(B) together with FIGS. 2, 3(A) and 3(B), the rotation sensor unit 100 is formed by mounting the components thereof to a sensor holding member 150 formed in a plate shape. There are held, on one side (first side) 151 of the sensor holding member 150, a leaf spring 131 as a pressing member 130, a rotary roller 110, a rotation sensor section 120, and a lever member 190. A coupling member 140 is provided on the opposite side (second side) 152 of the sensor holding member 150. The sensor holding member 150 rotatably supports the lever member 190 by means of a turning shaft 192.

The lever member 190 has an oblique part 191 on the opposite side from the side supported by the turning shaft 192. A rotary roller 110 is rotatably supported at the oblique part 191 of the lever member 190. The oblique part 191 is formed into an oblique shape corresponding to an oblique hole 301 in the opening 300A of the base member 300 as described later.

The turning shaft 192 of the lever member 190 is provided at a position offset from the center of rotation 110C of the rotary roller 110. As described later, when the sensor holding member 150 is attached to the base member 300, the turning shaft 192 of the lever member 190 is located at a position offset to the extension side of the rod 202 from the center of rotation 110C of the rotary roller 110. A bearing section 153 for rotatably supporting the turning shaft 192 of the lever member 190 is formed on the first side 151 of the sensor holding member 150.

A recess 150A is formed on the first side 151 of the sensor holding member 150, and a leaf spring 131 is accommodated in the recess 150A. The leaf spring 131 is formed by laminating a plurality of (e.g. four) plates. The number of the leaves of the leaf spring 131 is determined in view of a pressing force. Alternatively, any other spring such as a coil spring or a disc spring, or a pressing member utilizing a magnetic force may be employed in place of the leaf springs 131.

The leaf spring 131 is accommodated in the recess 150A such that the leaf spring 131 is capable of pressing the rotary roller 110 through the lever member 190 in accordance with deflection of the leaf spring 131. As described later, when the sensor holding member 150 is attached to the base member 300, the rotary roller 110 is pressed in a vertical or substantially vertical direction to the surface of the rod 202 by the leaf spring 131. Further, as described later, the spring force of the leaf spring 131, that is, the pressing force with which the leaf spring 131 presses the rotary roller 110 against the rod 202 is set to such a magnitude that the rotary roller 110 can prevent the slip on the surface of the rod 202. As described later, the spring force with which the leaf spring 131 presses the rotary roller 110 against the surface of the rod 202 is set to 12 kgf or higher. A ball 193 is interposed between the leaf spring 131 and the lever member 190 to transmit the spring force of the leaf spring 131 to the lever member 190.

The rotation sensor section 120, which is a sensor for detecting an amount of rotation of the rotary roller 110, is provided fixedly to the lever member 190. As shown in FIG. 2 in particular, a rotating shaft 111 is provided in the rotary roller 110 so as to be coaxial with the center of rotation 110C of the rotary roller 110. A bearing (roller bearing) 113 is fitted in the lever member 190. The rotating shaft 111 is fitted in the inside of the bearing 113 and rotatably supported by the bearing 112. The rotary roller 110 is arranged in the lever member 190 such that its rod contact surface 110A is exposed outside of the lever member 190 and can be in contact with the surface of the rod 202. The contact surface 110A of the rotary roller 110 is arranged so as to be substantially flush with an opposing surface 202A of the lever member 190 opposing the rod 202. Thus, the roller holding section of the lever member 190 is formed in an external shape having a maximum size possible to avoid interference with the rod 202, whereby the bearing 113 to be incorporated therein is allowed to have as great a size as possible and the pressing force and the lifetime can be maximized.

The rotary roller 110 is formed of an inelastic material such as a metal at least in its rod contact surface 110A which comes into contact with the rod 202. The used metal may be SCM415H, for example. The rotary roller 110 is formed to have a hardness equal to or lower than that of the rod 202, at least in its rod contact surface 110A which comes into contact with the rod 202. Further, the rotary roller 110 is formed flat at least in its rod contact surface 110A which comes into contact with the rod 202.

FIGS. 8(A), 8(B), 8(C), and 8(D) are diagrams for explaining a relation between rotation angle of the rotary roller 110 and output voltage detected and output by the rotation sensor section 120. The rotating shaft 111 is provided with a magnet 112 serving as a detecting medium. The magnet 112 is formed in a disc shape and attached to the rotating shaft 111 such that the polarized surfaces (S and N pole surfaces) of the magnet define planes orthogonal to the rotating shaft 111.

The rotation sensor section 120 is a non-contact magnetic force sensor which detects a magnetic force (magnetic flux density) generated by the magnet 112 as an electrical signal by means of a sensor member disposed at a position away from the magnet 112. The rotation sensor section 120 is formed by being provided with sensor members 121A and 121B at positions separated from the plane of rotation 112A, that is, the polarized surfaces of the magnet 112, by a predetermined distance. Hall ICs for example may be employed as the sensor members 121A and 121B.

As shown in FIGS. 8(A), 8(B) and 8(C), the sensor members 121A and 121B are arranged at respective positions on a plane parallel to the plane of the rotation 112A (N- and S-pole surfaces) of the magnet 112 so as to have a predetermined phase difference with respect to each other. Specifically, for example, two Hall ICs are arranged with a phase difference of 90° with respect to each other. When the rotating shaft 111 of the rotary roller 110 rotates and the magnet 112 also rotates according thereto, as shown in FIG. 8(D), the magnetic force (density of magnetic flux) transmitting through the sensor members 121A and 121B varies periodically in accordance with the rotation angle. Output voltages of the sensor member 121A in the states of FIGS. 8(B) and 8(C) are indicated by the arrows, respectively.

Since the sensor members 121A and 121B are arranged on the plane of rotation of the magnet 112 with a phase difference with respect to each other, the output voltages (detection signals) of the sensor members 121A and 121B are of different phases from each other. Accordingly, an absolute angle and a rotational direction of the rotary roller 110 can be measured based on the output voltages of the sensor members 121A and 121B. Further, a number of rotations of the rotary roller 110 can be measured by counting the number of times the detection signals output by the sensor members 121A and 121B vary over one cycle. Thus, an amount of displacement (strokes) of the rod 202 of the cylinder 200 can be measured based on the absolute angle of the rotary roller 110 and the number of rotations of the rotary roller 110.

The coupling member 140 is a member for electrically coupling the rotation sensor section 120 with an external signal line, that is, a sensor cable 160. The coupling member 140 is comprised of a terminal base 141 disposed on the second side 152 of the sensor holding member 150 and terminals 142 provided on the terminal base 141. The rotation sensor section 120 and the terminals 142 are electrically connected by means of an electrical signal line member 145. The electrical signal line member 145 may be embodied for example by using a board formed of a flexible material (flexible board) having electrical signal lines 145*a* printed thereon. The sensor holding member 150 is formed with a hole 154 into which the electrical signal line member 145 is inserted.

FIG. 9 is a cross-sectional view showing in detail a mode of connection between the electrical signal line member 145 and a terminal 142.

As shown in FIG. 9, a seating 143 of each terminal 142 on the terminal base 141 is composed of a current-carrying member 143*a* and an insulation member 143*b* (plastic). Each seating 143 is formed with a threaded hole 144. On the other hand, a crimp-style terminal 161 having a screw insertion hole 161*a* is electrically connected to an end of the sensor cable 160 by caulking or the like. A screw insertion hole 145*c* is formed at an end of the electrical signal line member 145, and the electrical signal line 145*a* (e.g. copper foil) is exposed.

A shaft 146*a* of the screw 146 is inserted through a washer 147, the screw insertion hole 161*a* of the crimp-style terminal 161, and the screw insertion hole 145*c* of the electrical signal line member 145, and is screwed into the threaded hole 144 of the seating 143 of the terminal base 141, whereby these crimp-style terminal 161 and electrical signal line member 145 are joined to the terminal 142 and are electrically connected to each other. According to this embodiment, the electrical signal line member 145 and the sensor cable 160 are joined to each terminal 142 of the terminal base 141 so that they are electrically connected together. This eliminates the need of connectors or soldering used in the related art, and makes it possible to electrically connect the rotation sensor unit 100 to an external controller in a smaller space at a lower cost.

As shown in FIG. 3(A), the base member 300 has an opening 300A for accommodating the bearing section 153 of the sensor holding member 150, the rotary roller 110, the rotation sensor section 120, and the lever member 190.

The opening 300A is capable of accommodating the oblique part 191 of the lever member 190 together with the rotary roller 110, and is formed to include an oblique hole 301 which extends from the extension side to the retraction side of the rod 202 along the direction from the outer periphery to the inner periphery of the base member 300.

As shown in FIG. 2, the base member 300 has a connection surface 302 which is contact-connected to a connection surface 155 of the first side 151 of the sensor holding member 150, the connection surface 155 including the ends of the leaf spring 131. The connection surface 155 of the first side 151 of the sensor holding member 150 and the connection surface 302 of the base member 300 are positioned to each other by means of a pin 901 and then fastened and connected together by means of a bolt 902. A sealant 184 for water proofing or the like is interposed between the connection surface 155 of the first side 151 of the sensor holding member 150 and the connection surface 302 of the base member 300. As a result of the connection of the sensor holding member 150 to the base member 300, as shown in FIG. 3(A), the bearing section 153 of the sensor holding member 150, the rotary roller 110, the rotation sensor section 120, and the lever member 190 are accommodated in the opening 300A. The oblique part 191 of the lever member 190 and the rotary roller 110 are inserted into the oblique hole 301 in the opening 300A. Further, the opposite ends of the leaf spring 131 are fixedly held by the base member 300, while a central part of the leaf spring 131 is subjected to the spring reaction force from the lever member 190 via the ball 193. As a result, the rotary roller 110 is pressed by the leaf spring 131 in a vertical or substantially vertical direction to the surface of the rod 202 to be in contact with the surface of the rod 202 of the cylinder 200, and thus the rotary roller 110 is rotated in accordance with displacement of the rod 202.

As shown in FIG. 2, a connection surface 171 of the lid member 170 is contact-connected to a connection surface 157 of the second side 152 of the sensor holding member 150. The connection surface 157 of the second side 152 of the sensor holding member 150 and the connection surface 171 of the lid member 170 are fastened and connected, together with the base member 300, by means of the bolt 902. A sealant 185 for water proofing or the like is interposed between the connection surface 157 of the second side 151 of the sensor holding member 150 and the connection surface 171 of the lid member 170. In this manner, the lid member 170 is attached to the sensor holding member 150 such that the lid member 170 covers the coupling member 140 on the sensor holding member 150. The lid member 170 is formed with a hole 173 into which the sensor cable 160 is inserted.

As shown in FIG. 3(A), dust seals 180 and 181 are provided on the inner peripheral surface of the base member 300, at different positions in the stroke direction of the rod 202 such that the dust seals 180 and 181 are located on the opposites of the rotary roller 110. A rod seal 182 is further provided on the inner peripheral surface of the base member 300 at a predetermined position separated from the dust seal 181 in the direction in which the rod 202 is retracted. The dust seals 180 and 181, and the rod seal 182 are provided on the inner peripheral surface of the base member 300 such that the rod 202 is slidable therein. A structure for mounting the dust seals 180 and 181 will be described below.

An annular collar 350 having a cut-away portion at a position corresponding to the oblique hole 301 is mounted on the inner peripheral surface of the base member 300. A detent ball 370 is provided between the collar 350 and the base member 300. The collar 350 is mounted on the inner peripheral surface of the base member 300 such that the dust seal 181 on the retraction side of the rod 202 is pressed against the end face on the base member on the retraction side of the rod 202. The dust seal 180 on the extension side of the rod 202 is mounted to the collar 350. The dust seal 180 is fixed to the collar 350 by means of a snap ring 360. Further, the collar 350 is fixed to the base member 300 by means of a snap ring 361.

In this manner, the dust seal 181 on the inner side of the cylinder is press-fixed to the end face of the base member 300 by means of the collar 350, and thus the need of providing a snap ring for fixing the dust seal 181 can be eliminated. Further, the end face of the collar 350 where the rotary roller 110 is arranged is cut away, making it possible to attach the rotary roller 110 in a smaller space.

Second Exemplary Embodiment

FIG. 10 is a diagram showing a structure of a cylinder stroke position measurement device 1 according to a second exemplary embodiment as viewed in cross section of a cylinder rod. FIG. 11(A) is diagram of the same cylinder rod as viewed in longitudinal section thereof, and FIG. 11(B) is a diagram showing an external appearance of the cylinder.

In the following, description will be made regarding different components from the first exemplary embodiment, while components having the same functions as those of the first exemplary embodiment are indicated by the same reference numerals and description thereof will be omitted if appropriate.

In the first exemplary embodiment described above, the base member 300 functioning as a cylinder head member is mounted to the head portion 200H of the cylinder 200 by screwing the same. According to the second exemplary embodiment, in contrast, the base member 300 is mounted to a known cylinder head member 210 mounted on the head portion 200H of the cylinder 200 by bolting the same.

Specifically, as shown in FIGS. 10, 11(A) and 11(B), a known cylinder head member 210 is fastened to the upper end face 203U of the outer tube 203 of the cylinder 200 by means of a bolt 212. A dust seal 181 and a rod seal 182 are provided on the inner peripheral surface of the cylinder head member 300.

The base member 300 is further fastened to the upper end face 203U of the known cylinder head member 210 by means of a bolt 213. The base member 300 is fastened together with both the cylinder head member 210 and the outer tube 203 by means of the bolt 213.

A rotation sensor unit 100 is formed by its components mounted to a sensor holding member 150. A coil spring 132 serving as the pressing member 130, a rotary roller 110, a rotation sensor section 120, and a spring holding member 195 are held on a first side 151 of the sensor holding member 150. A coupling member 140 is provided on a second side 152 of the sensor holding member 150. Like the first exemplary embodiment, a coil spring 132 serving as the pressing member is accommodated in a recess 150A formed in the sensor holding member 150, such that the rotary roller 110 is pressed against the surface of the rod 202 in accordance with deflection of the coil spring 132.

In other words, the sensor holding member 150 extendably/retractably supports the spring holding member 195 via the coil spring 132.

The spring holding member 195 is composed of a spring chamber member 195A and a rotary roller chamber member 195B. The spring holding member 195 is formed by pressing the spring chamber member 195A into the rotary roller chamber member 195B.

The coil spring 132 is accommodated in the spring chamber member 195A of the spring holding member 195 such that one end 132A of the coil spring 132 abuts against. A ventilation hole 195C is formed between the spring chamber member 195A and the rotary roller chamber member 195B. The ventilation hole 195C is provided to allow air to escape from the spring chamber member 195A when the coil spring 132 is extended or retracted.

The rotary roller 110 is accommodated in the rotary roller chamber 195B of the spring holding member 195 such that it is rotatably supported by a bearing 113. The coil spring 132 and the rotary roller 110 are arranged such that the coil spring 132 can press the rotary roller 110 in a direction of extension/retraction of the coil spring 132. When the sensor holding member 150 is attached to the base member 300, the rotary roller 110 is pressed by the coil spring 132 in a vertical or substantially vertical direction to the surface of the rod 202.

A recess 150A is formed on the first side 151 of the sensor holding member 150, and the other end 132B of the coil spring 132 abuts against the bottom surface of this recess 150A, while the spring holding member 195 is fitted slidably along the side surface of the recess 150A.

A dust seal 180 is provided on the inner peripheral surface of the base member 300.

Therefore, when the base member 300 is mounted to the cylinder head member 210, the dust seals 180 and 181 are arranged at different positions in the stroke direction of the rod 202 such that the rotary roller 110 is located between the dust seals 180 and 181.

The base member 300 has an opening 300A which accommodates a part of the spring holding member 195 corresponding to the rotary roller chamber 195B and the rotation sensor section 120.

When the sensor holding member 150 is connected to the base member 300, the part of the spring holding member 195 corresponding to the rotary roller chamber 195B and the rotation sensor section 120 are thereby accommodated in the opening 300A. The rotary roller 110 is pressed by the coil spring 132 in a vertical or substantially vertical direction to the surface of the rod 202 to be in contact with the surface of the rod 202 of the cylinder 200, and thus the rotary roller 110 is rotated in accordance with displacement of the rod 202.

In the following, functions and effects of the first and second exemplary embodiments described above will be explained.

A base member 300 is prepared for each size of the cylinder 200, that is, for each diameter size of the rod 202 and each diameter size of the outer tube 203. However, as shown in FIG. 2 or FIG. 10, the base member 300 is fabricated such that a distance L from the surface of the rod 202 to a connection surface 302 where the sensor holding member 150 of the base member 300 is mounted is fixed regardless of the diameter size of the rod 202 or the diameter size of the outer tube 203. Since the distance L from the surface of the rod 202 to a mounting surface 302 where the sensor holding member 150 of the base member 300 is mounted is fixed, a distance from the sensor holding member 150 of the rotation sensor unit 100 to the rod contact surface 110A of the rotary roller 110 can be made fixed. Alternatively, a common base member 300 may be used for all the sizes of the cylinder 200, while another component such as spacer may be used to fix the distance L.

Thus, according to the exemplary embodiments of the invention, the rotation sensor unit 100 can be used in common for the cylinders 200 having different rod diameters or outer tube diameters only by preparing different base members 300 according to the different rod diameters or outer tube diameters. According to the exemplary embodiments of the invention, in this manner, it is made possible to use the rotation sensor unit 100 in common for measuring a cylinder stroke position by detecting an amount of rotation of the rotary roller by means of the rotation sensor.

Further, according to the exemplary embodiments, the lid member 170 is attached to the sensor holding member 150 so as to cover the coupling member 140. This makes it possible to protect the rotation sensor unit 100 from external dust or the like.

According to the first exemplary embodiment, in particular, the leaf spring 131 is used as the pressing member 130, and the leaf spring 131 is accommodated in the recess 150A such that the rotary roller 110 is pressed in a deflection direction of the leaf spring 131 via the lever member 190. This makes it possible to reduce the space of the rotation sensor unit 100 in the direction of extension/retraction of the spring in comparison with a case in which a coil spring is used.

Further, according to the exemplary embodiments of the invention, the base member 300 is provided with the dust seals 180 and 181 which are arranged in different positions in the stroke direction of the rod 202 such that the rotary roller 110 is located between the dust seals 180 and 181. This makes it possible to prevent external dust or the like from entering the rotary roller 110, particularly the part where the rotary roller 110 is in contact with the rod 202, and to prevent dust or the like generated in a place where the rotary roller 110 is located from entering the inside of the cylinder.

Further, according to the first exemplary embodiment, the lever member 190 has the oblique part 191 having a shape corresponding to the oblique hole 301 of the opening 300A in the base member 30, so that the oblique part 191 of the lever member 190 is inserted into the oblique hole 301 together with the rotary roller 110. This makes it possible to arrange the rotary roller 110 and the dust seal 180 as far as possible to the side where the rod 202 is retracted. The stroke range of the rod 202 is restricted by the position of the dust seal 180 (that is, the position of the rotary roller 110). Therefore, the stroke range of the rod 202 can be increased as the dust seal 180 is arranged further to the side where the rod 202 is retracted. This will be described with reference to FIGS. 4(A), 4(B), 4(C), 4(D), and FIG. 5 (comparative example).

As shown in FIG. 4(A), a cylinder head member 8000 is typically mounted to a cylinder head portion. The cylinder head member 8000 is an indispensable member for the cylinder for slidably supporting a rod 7000 and preventing dust or the like from entering the inside of the cylinder by means of a dust seal 8100. A threaded portion 8200 is formed on the outer periphery of the cylinder head member 8000, and this threaded portion 8200 is engaged with a threaded portion on the inside of the cylinder to thereby mount the cylinder head member 8000 to the cylinder head portion.

The stroke range of the rod 7000 is restricted by the position of the upper end of the cylinder head member 8000. The rod 7000 is capable of moving freely in the stroke range ST from its maximum extended position to its minimum retracted position.

It is assumed that the rotation sensor unit 9000 as explained in FIGS. 1(B) and 1(C) is mounted to the cylinder head portion. In this case, as shown in FIG. 4(B), the entire rotation sensor unit 9000 must be mounted to the upper end face of the cylinder head member 8000 while avoiding the threaded portion 8200 and the dust seal 8100 of the cylinder head member 8000. Therefore, the rotary roller 1000 is located at a position separated from the position of the upper end of the cylinder head member 8000 by a predetermined distance ΔST to the side where the rod is extended. The minimum retraction position of the rod 7000 is restricted by the position of the rotary roller 1000. Therefore, in a case in which the rotation sensor described in Patent Document 1 is mounted, the stroke range of the rod 7000 is reduced, in comparison with other cases, by a distance according to the distance ΔST from the position of the upper end of the cylinder head member to the position of the rotary roller 1000.

In addition, if an attempt is made to ensure the same stroke range as the cylinder shown in FIG. 4(A) while mounting the rotation sensor unit shown in FIGS. 1(B) and 1(C) to the cylinder head portion, a distance PN between the opposite pins of the cylinder is increased as shown in FIG. 4(C). Therefore, in a case in which the rotation sensor shown in FIGS. 1(B) and 1(C) is mounted, the space of the cylinder is increased in comparison with the other cases.

FIG. 4(D) is a schematic diagram showing a case in which the rotation sensor unit 100 and the base member 300 according to the first exemplary embodiment of the invention are mounted to the cylinder head portion, for the purpose of comparison with FIGS. 4(A), 4(B) and 4(C). According to the present exemplary embodiment, the base member 300 functioning as a head member is attached to the cylinder head in the same manner as the known head member 8000. The base member 300 is formed with an oblique hole 301, while the lever member 190 is formed with an oblique part 191 having a shape corresponding to the oblique hole 301 of the base member 300, so that the oblique part 191 of the lever member 190 is inserted into the oblique hole 301 together with the rotary roller 110. This makes it possible to locate the dust seal 180 and the rotary roller 110 at a position offset to the retraction side of the rod from the position of the upper end of the known cylinder head member 8000. In other words, it is made possible to locate the dust seal 180 at a substantially same position as that of the known dust seal 8100. Specifically, comparing FIG. 4(D) with FIG. 4(B), in the related art shown in FIG. 4(B), the dust seal 180 must be located at a position separated from the position of the upper end of the known cylinder head member 8000 to the rod retraction side by a distance corresponding to the predetermined distance AST, whereas according to the present exemplary embodiment shown in FIG. 4(D), the dust seal 180 can be located at a position offset from the position of the upper end of the known cylinder head member 8000 to the rod extension side (at a substantially same position as that the known dust seal 8100).

According to the exemplary embodiments of the invention, the stroke range of the rod 7000 is enlarged in comparison with the related art, and the reduction of the stroke range can be minimized. Further, the need is eliminated of increasing the distance PN between the pins of the cylinder as shown in FIG. 4(C) in order to ensure the stroke range of the rod 7000, and thus the increase of the space of the cylinder can be suppressed.

FIG. 5 is a schematic diagram showing a comparative example in which the rotary roller 110 is pressed by the pressing member 130 obliquely to the surface of the rod 7000. The cylinder is designed such that the rod 7000 can be displaced to a certain extent also in a vertical direction y with respect to the stroke direction x. If the rod 7000 is displaced not only in the stroke direction x but also in the vertical direction y thereto during measurement by a rotation sensor, the rotary roller 110 will rotate excessively to an extent corresponding to the amount of displacement in the vertical direction y since the rotary roller 110 is pressed obliquely to the surface of the rod. This causes an error in the amount of rotation of the rotary roller 110. According to the present invention, in contrast, the rotary roller 110 is pressed substantially vertical to the surface of the rod. Therefore, even if the rod 202 is displaced in the vertical direction y, the rotary roller 110 will be displaced only in the vertical direction y, while the rotary roller 110 will not be rotated according to the displacement in the vertical direction y. Therefore, the error involved in the amount of rotation of the rotary roller 110 is very little. Thus, according to the present invention, the rotary roller 110 can be arranged without slanting the direction to press the pressing member 130 obliquely, and hence the advantageous effect described above, that is, the minimization of reduction of the stroke range can be achieved without causing significant error in the measurement result of the rotation sensor.

Further, in the first exemplary embodiment, the leaf spring 131 is used as the pressing member 130, and the ball 193 is interposed between the leaf spring 131 and the lever member 190 so that the ball 193 receives the spring force of the leaf spring 131 and transmits the same to the lever member 190. This makes it possible to fix the position pressed by the pressing member 130 such as a leaf spring, whereby a spring constant can be fixed, and thus a stable and constant pressing force can be obtained. Variation in the pressing force can be suppressed, and slip of the rotary roller 110 or damage to the surface of the rod 202 can be prevented.

Further, in the first exemplary embodiment, the rotation sensor section 120 is attached to the lever member 190. This makes it possible to reduce the size of the rotation sensor unit 100.

Further, in the exemplary embodiments of the invention, the contact surface 110A of the rotary roller 110 is formed of an inelastic member such as a metal. Therefore, the elasticity will not be varied due to temperature change or aging, and hence the change in slip amount or in diameter of the rotary roller 110 can be suppressed. This makes it possible to suppress the reduction of accuracy in measurement of the stroke of the rod 202 of the cylinder 200 caused by temperature change or aging. It should be understood that only the part of the rotary roller 110 corresponding to the contact surface 110A may be formed of an inelastic member as described above, or the entire rotary roller 110 may be formed of an inelastic member.

The contact surface 110A of the rotary roller 110 is formed of an inelastic material (metal) having a lower coefficient of friction with respect to the surface of the rod also formed of a metal, in comparison with an elastic material such as rubber. However, since the rotary roller 110 is pressed by the pressing member 130 against the surface of the rod 202 with a pressing force suppressing the slip, a great friction force is generated between the rotary roller 110 and the rod 202 whereby the slip can be prevented. It should be noted that a too great pressing force may accelerate the progress of wear of the rotary roller 110 and the rod 202. Therefore, it is desirable to set the pressing force to a value predetermined in view of the wear or lower.

In the present exemplary embodiments, at least the surface 110A of the rotary roller 110 which is in contact with the rod 202 is formed flat. Therefore, even if the rotary roller 110 comes into contact with the surface of the rod 202 at different positions, the radius of rotation d of the rotary roller 110 represents the same values d, d at these positions as shown in FIG. 6(B). Therefore, the measurement accuracy of the stroke of the rod 202 of the cylinder 200 will not be deteriorated depending on the position where the rotary roller 110 is in contact with the surface of the rod 202. In contrast, in the rotary roller 1000 shown in FIGS. 1(B) and 1(C), the contact surface 1000A of the rotary roller 1000 is formed in a circular arc shape along the outer peripheral surface of the rod 7000 as shown in FIG. 6(A). Therefore, if the rotary roller 1000 comes into contact with the surface of the rod 7000 at different positions, the radius of rotation d of the rotary roller 1000 will represent different values d and (d+Δd) at these positions. This causes a problem that the accuracy in measurement of the stroke of the cylinder rod is deteriorated depending on the position where the rotary roller 1000 is in contact with the surface of the rod 7000. It should be understood that even if the contact surface 1000A of the rotary roller 1000 is flat, the contact surface 1000A will be deformed into a circular arc shape by being in contact with the surface of the rod 7000 as long as it is formed of an elastic member such as rubber. Therefore, this problem can be solved by the exemplary embodiments of the invention.

According to the exemplary embodiments of the invention as described above, the slip between the rotary roller 110 and the rod 202 can be suppressed, and the accuracy in measurement of the rod stroke can be maintained high by holding the radius of rotation d of the rotary roller 110 fixed regardless of temperature change or aging, and regardless of the position where the rotary roller 110 is in contact with the rod 202.

Further, in the exemplary embodiments of the invention, the pressing force with which the pressing member 130 presses the rotary roller 110 against the surface of the rod 202 is set to 12 kgf or higher. FIG. 12 shows a relation between pressing force with which the rotary roller 110 is pressed against the rod 202 and amount of slip of the rotary roller 110 on the surface of the rod 202 observed every time a shock is given under fixed conditions. As shown in FIG. 12, the slip amount can be reduced to a predetermined reference level or lower as long as the pressing force is 12 kgf or higher.

Further, in the exemplary embodiments of the invention, the rotary roller 110 is formed to have a hardness equal to or lower than that of the rod 202 at least in its surface 110A which is in contact with the rod 202. This makes it possible to prevent the rod 202 from being worn by being in contact with the rotary roller 110. Only the part of the rotary roller 110 corresponding to the contact surface 110A may be formed to have such a hardness as described above, or the entire rotary roller 110 may be formed to have such a hardness.

BRIEF DESCRIPTION OF THE DRAWINGS

FIG. 3(A) is a diagram showing the structure of the cylinder stroke position measurement device according to the first exemplary embodiment, as viewed in longitudinal section of the cylinder rod, while

FIGS. 4(A), 4(B), and 4(C) are diagrams each showing a stroke range of a cylinder according to the related art, while FIG. 4(D) is a diagram showing a stroke range of a cylinder according to an exemplary embodiment of the present invention;

FIG. 6(A) is a cross-sectional view showing a shape of a contact surface of a rotary roller in a related art, while

FIG. 11(A) is also a diagram showing the cylinder stroke position measurement device according to the second exemplary embodiment, as viewed in longitudinal direction of the cylinder rod, while

Figure 1A:
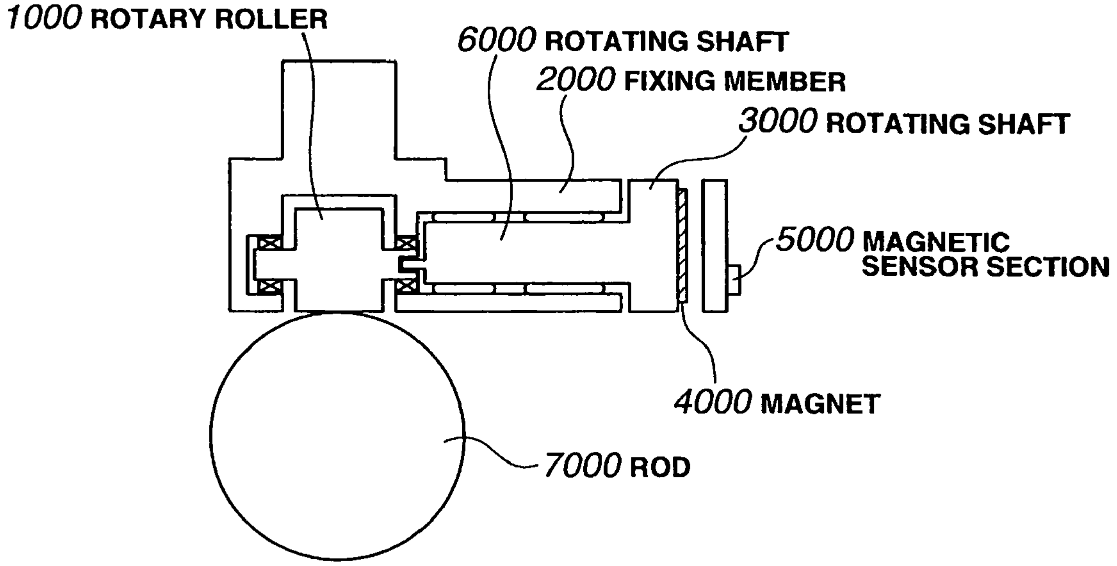
FIG. 1(A) is a diagram used for explaining the related art, schematically showing a structure of a rotation sensor forming a cylinder stroke position measurement device.
Figure 1B:
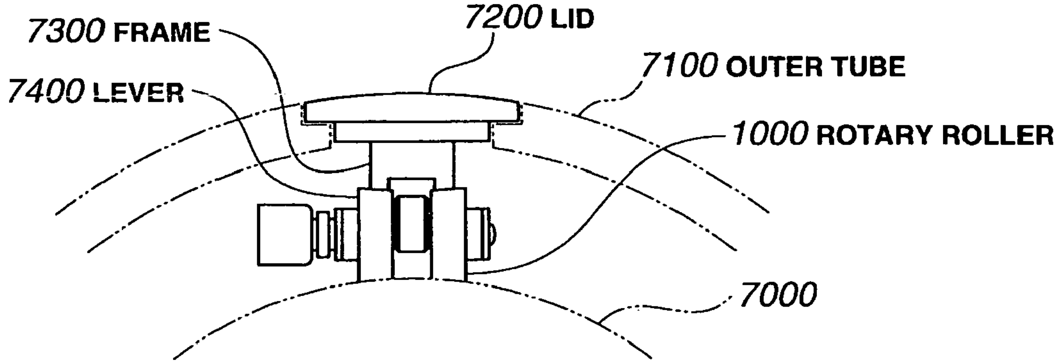
FIGS. 1(B) and 1(C) are diagrams used for explaining the related art, showing a structure of the rotation sensor.
Figure 1C:
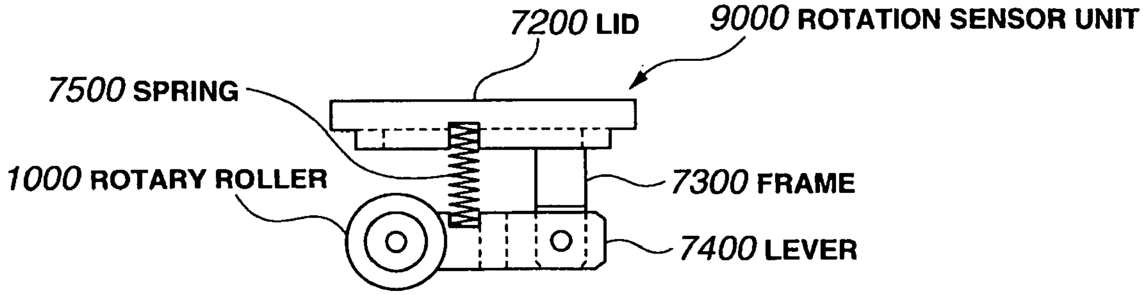
Figure 2:
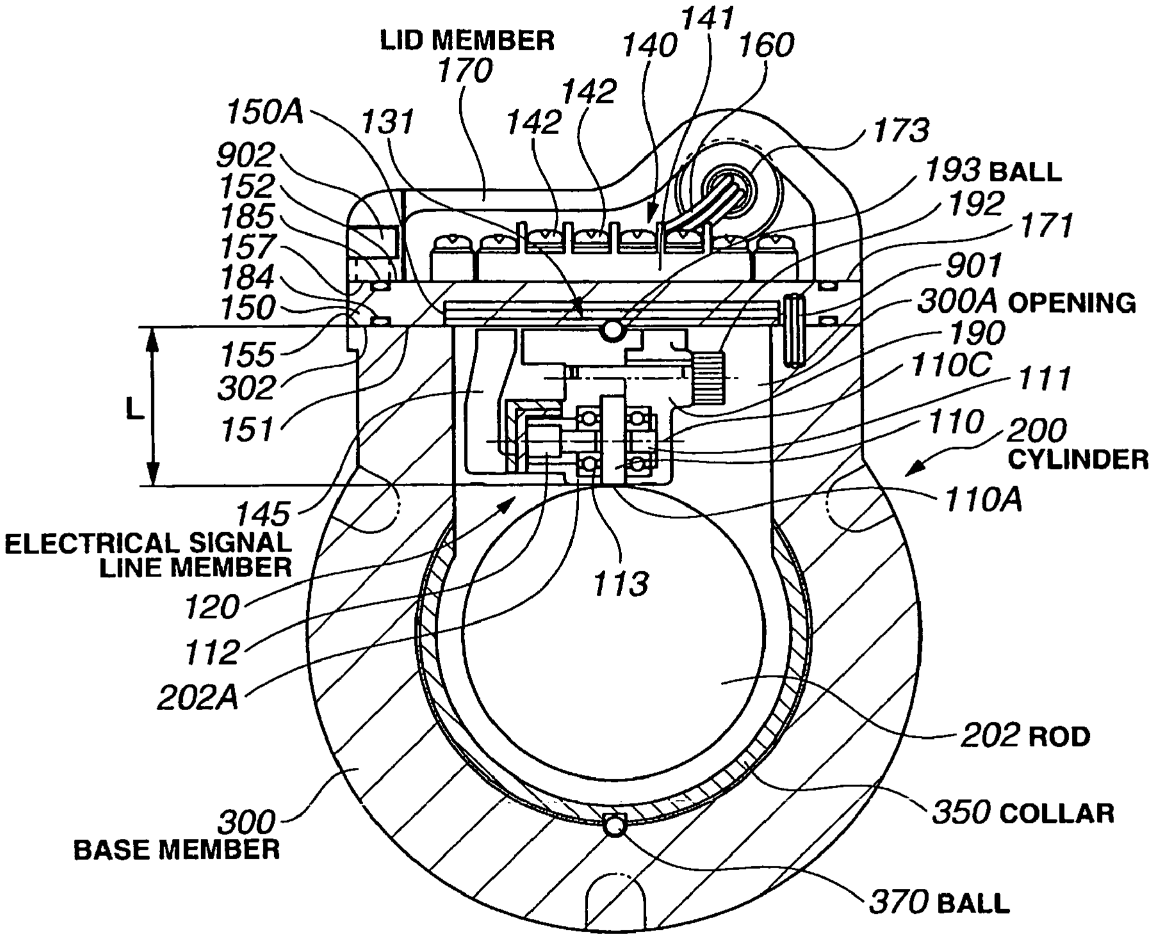
FIG. 2 is a diagram showing a structure of a cylinder stroke position measurement device according to a first exemplary embodiment of the invention, as viewed in cross section of a cylinder rod.
Figure 3A:
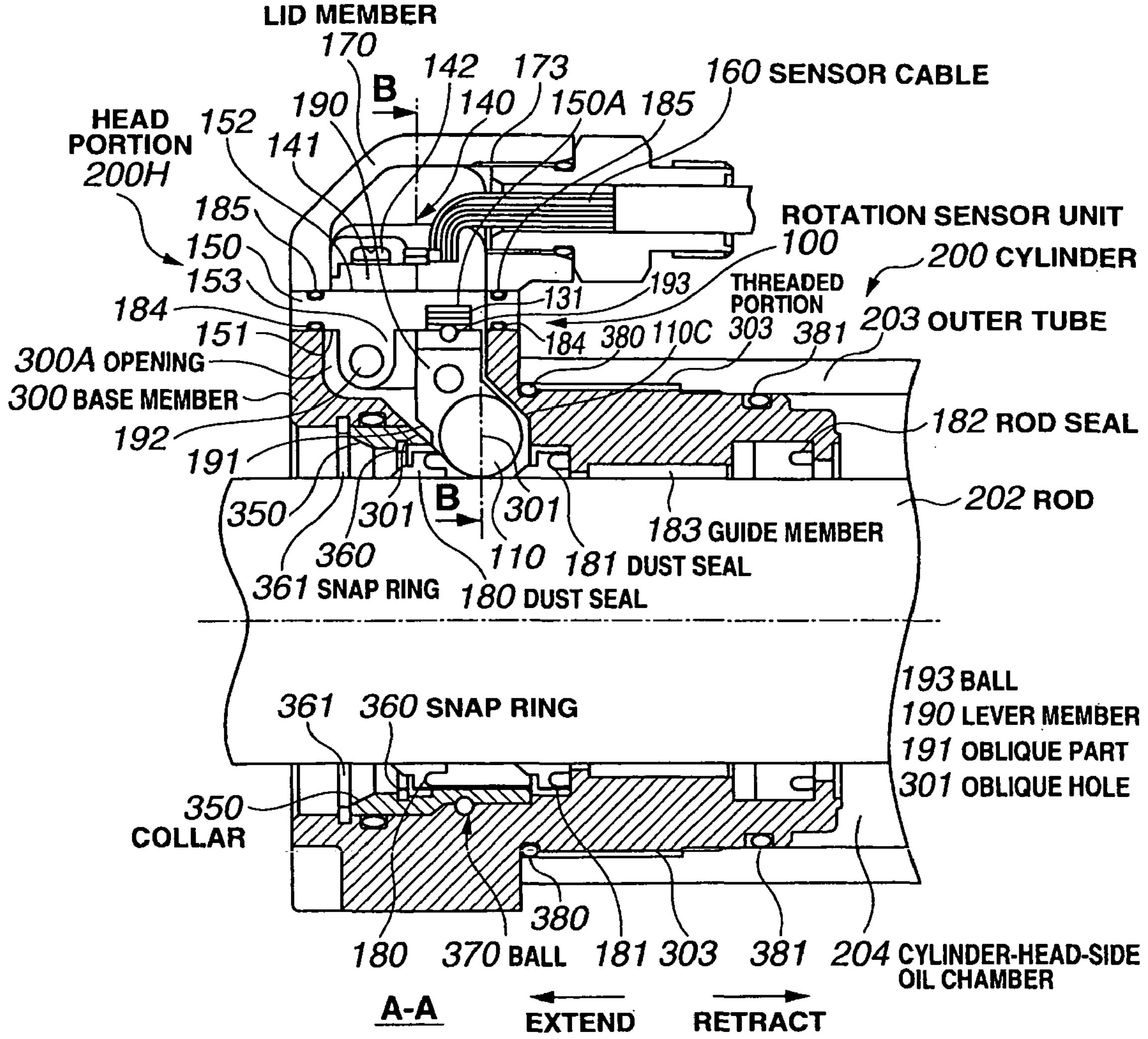
Figure 3B:
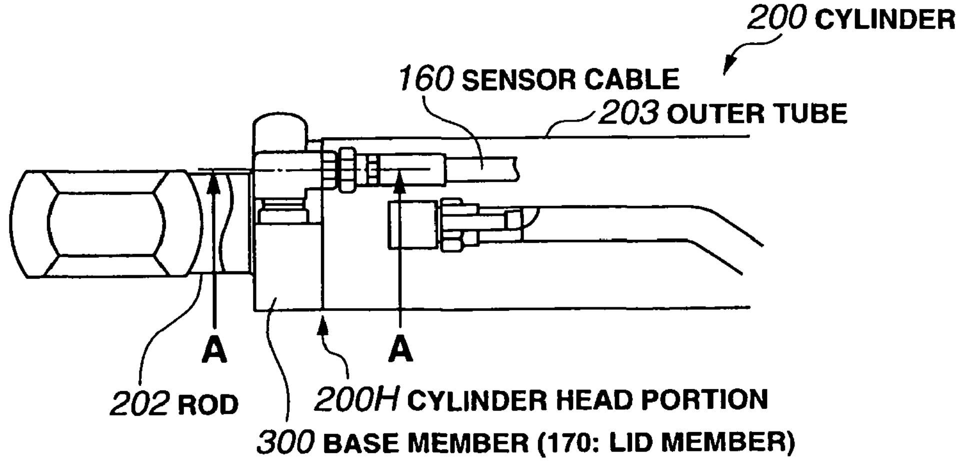
FIG. 3(B) is a diagram showing an external appearance of the cylinder.
Figure 4:
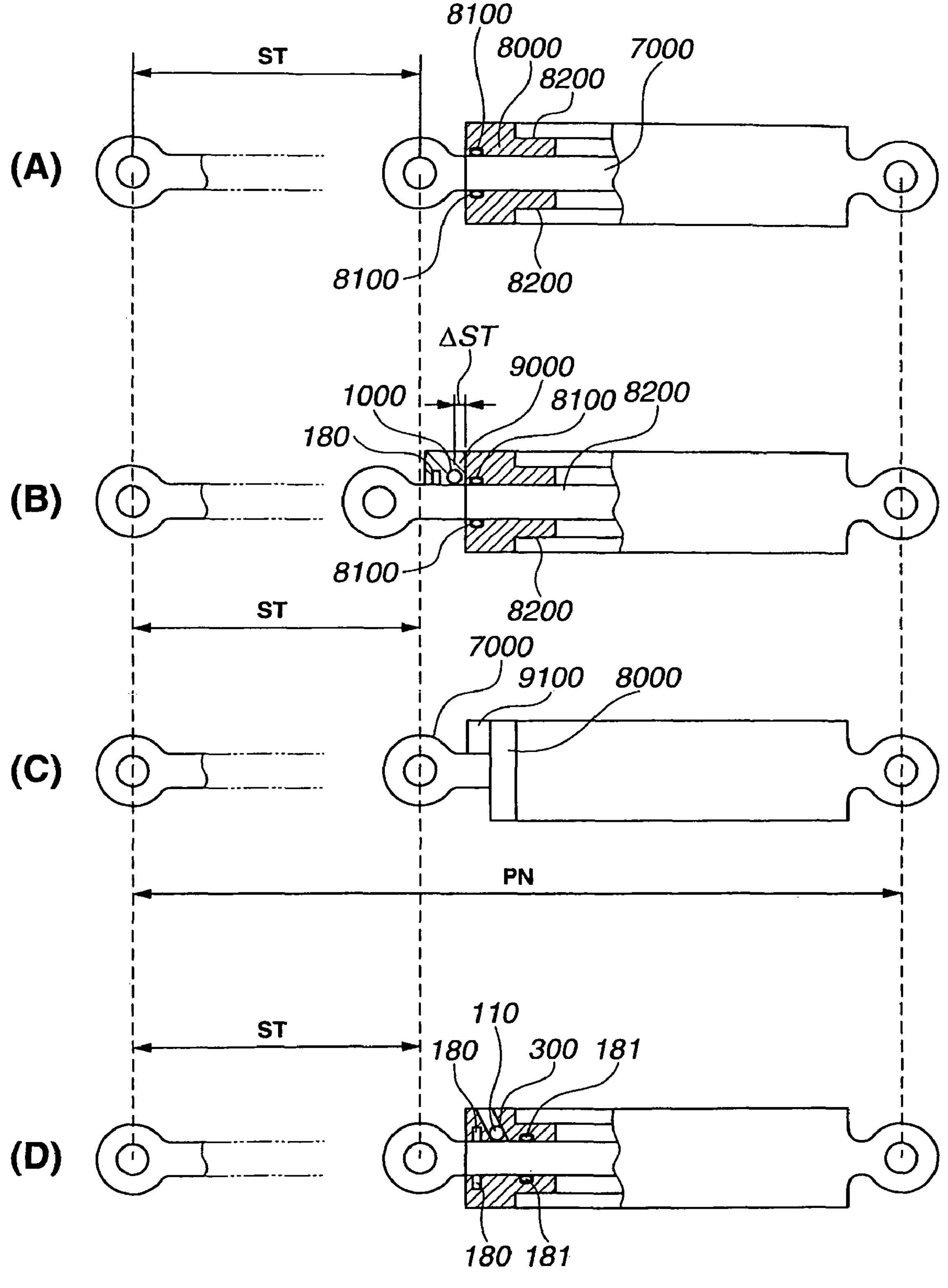
Figure 5:
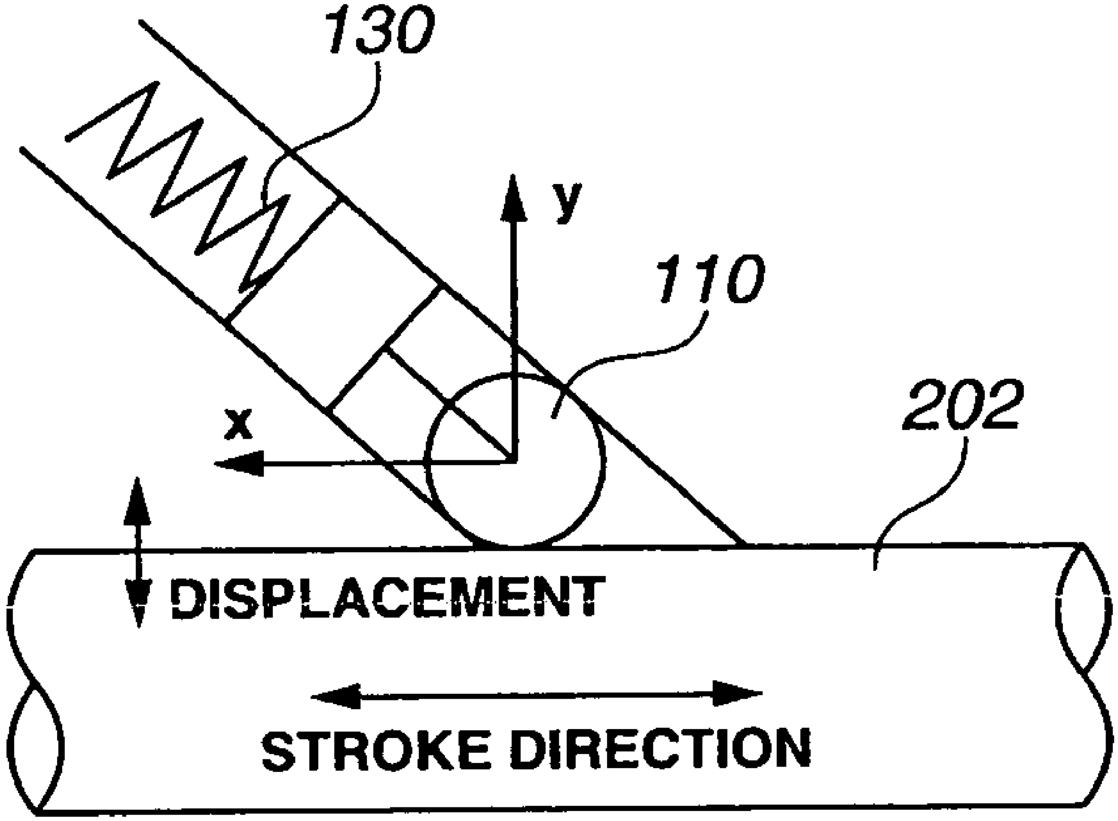
FIG. 5 is a schematic view showing a structure, as a comparative example for the exemplary embodiment, in which a rotary roller is pressed by a pressing member in an oblique direction to the surface of the rod.
Figure 6A:
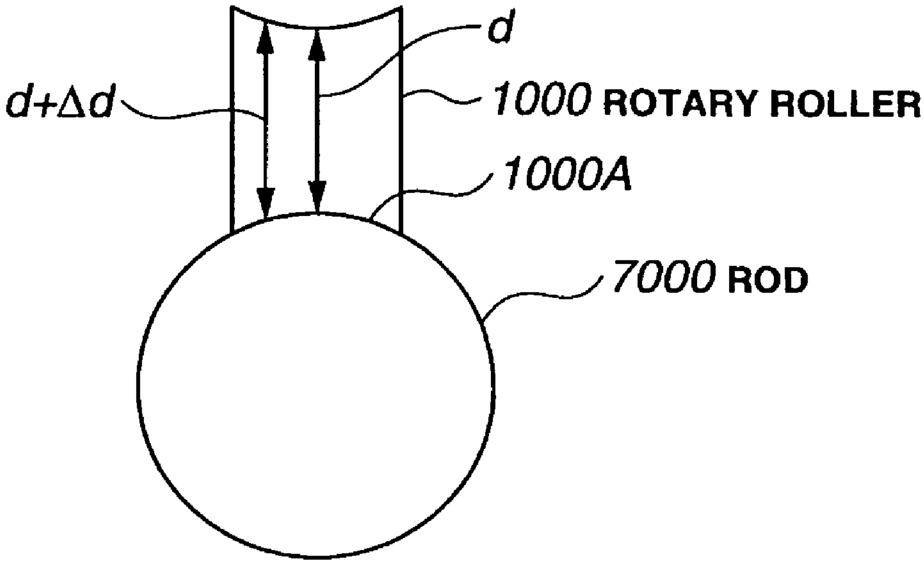
Figure 6B:
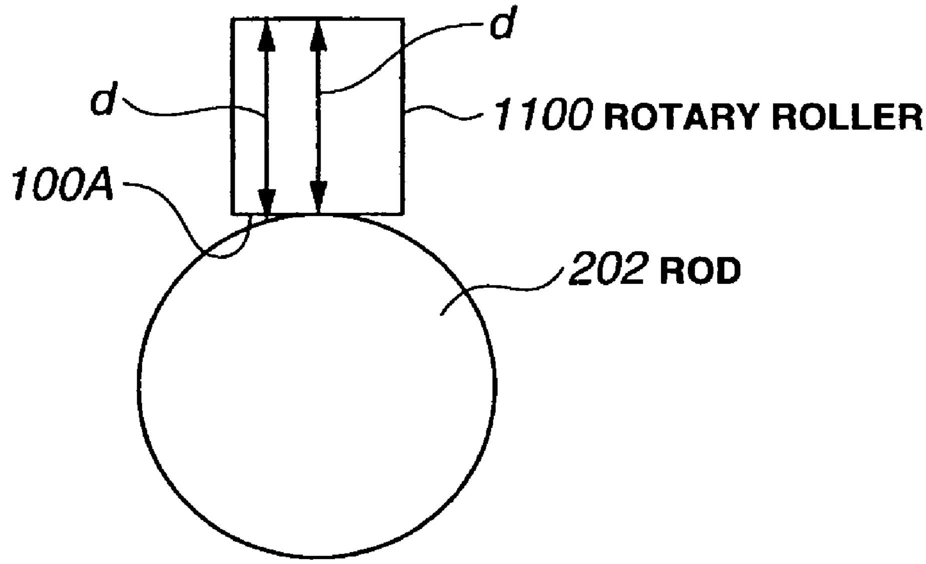
FIG. 6(B) is a cross-sectional view showing a shape of a contact surface of a rotary roller according to the exemplary embodiment.
Figure 7:
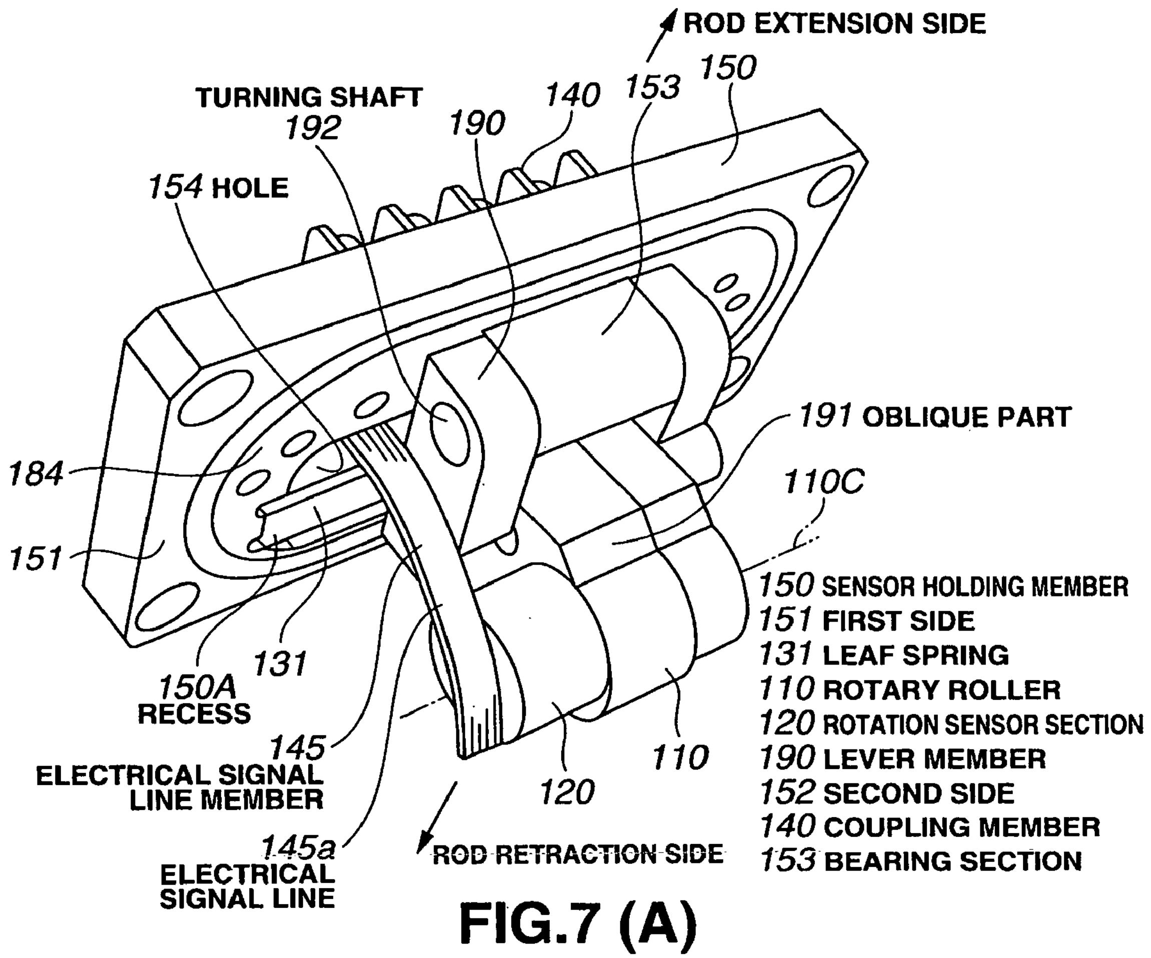
FIGS. 7(A) and 7(B) are perspective views of an external appearance of the rotation sensor unit as viewed from different directions.
Figure 7B:
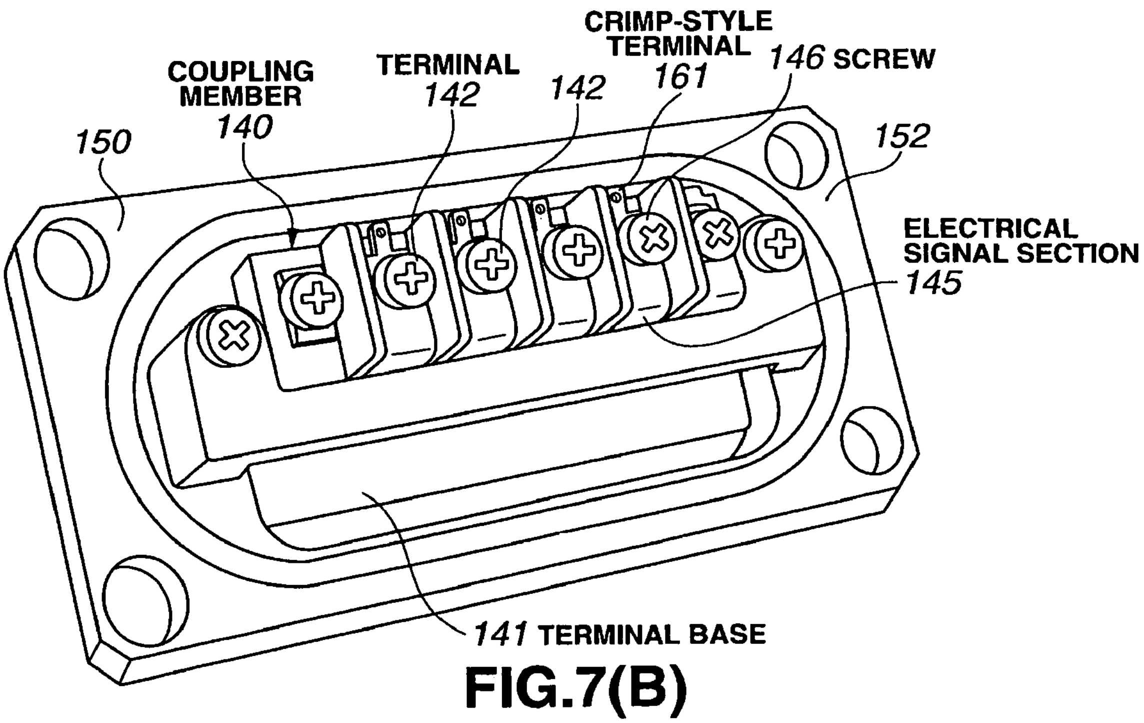
Figure 8A:
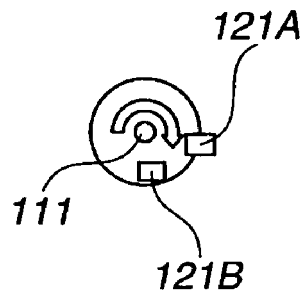
FIGS. 8(A), 8(B), 8(C) and 8(D) are diagrams for explaining relation between rotation angle of the rotary roller and output voltage detected and output by the rotation sensor section.
Figure 8B:
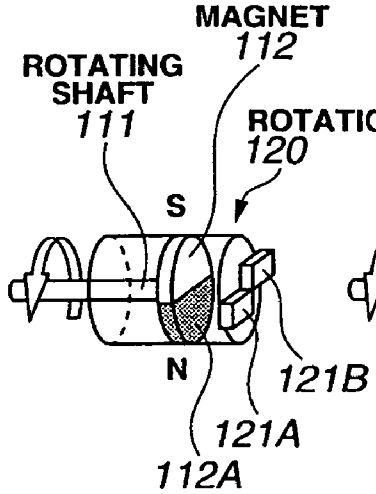
Figure 8C:
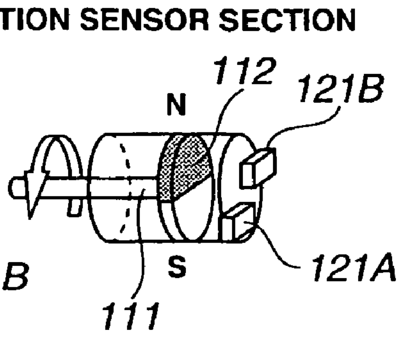
Figure 8D:
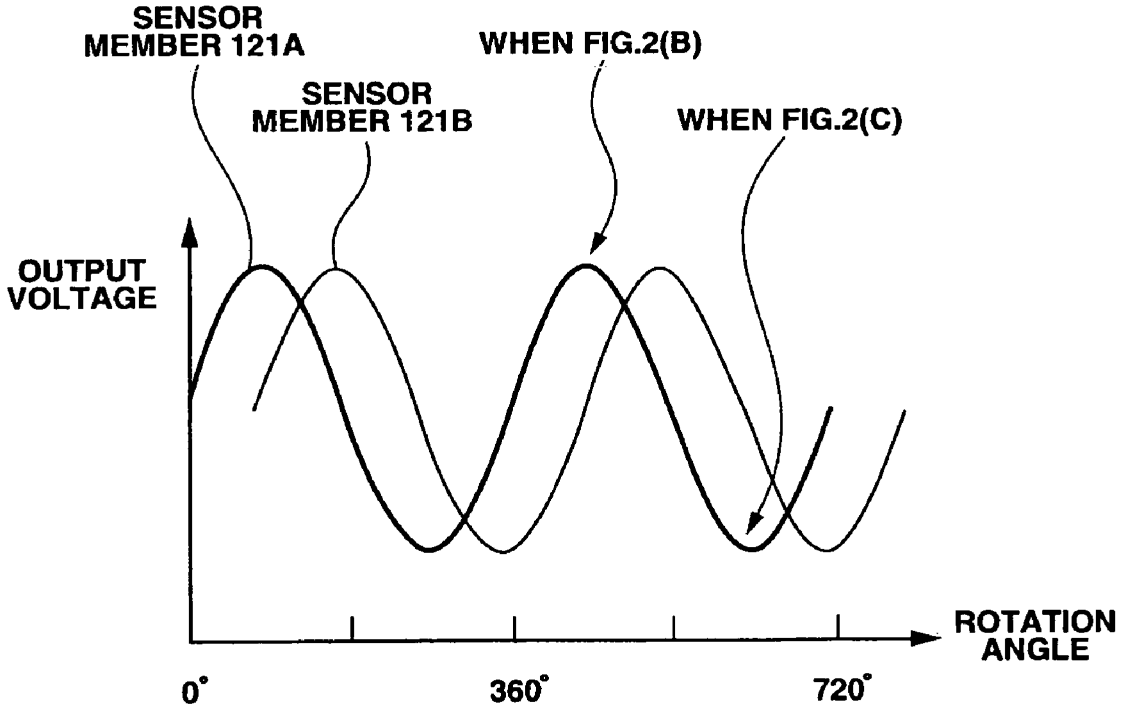
Figure 9:
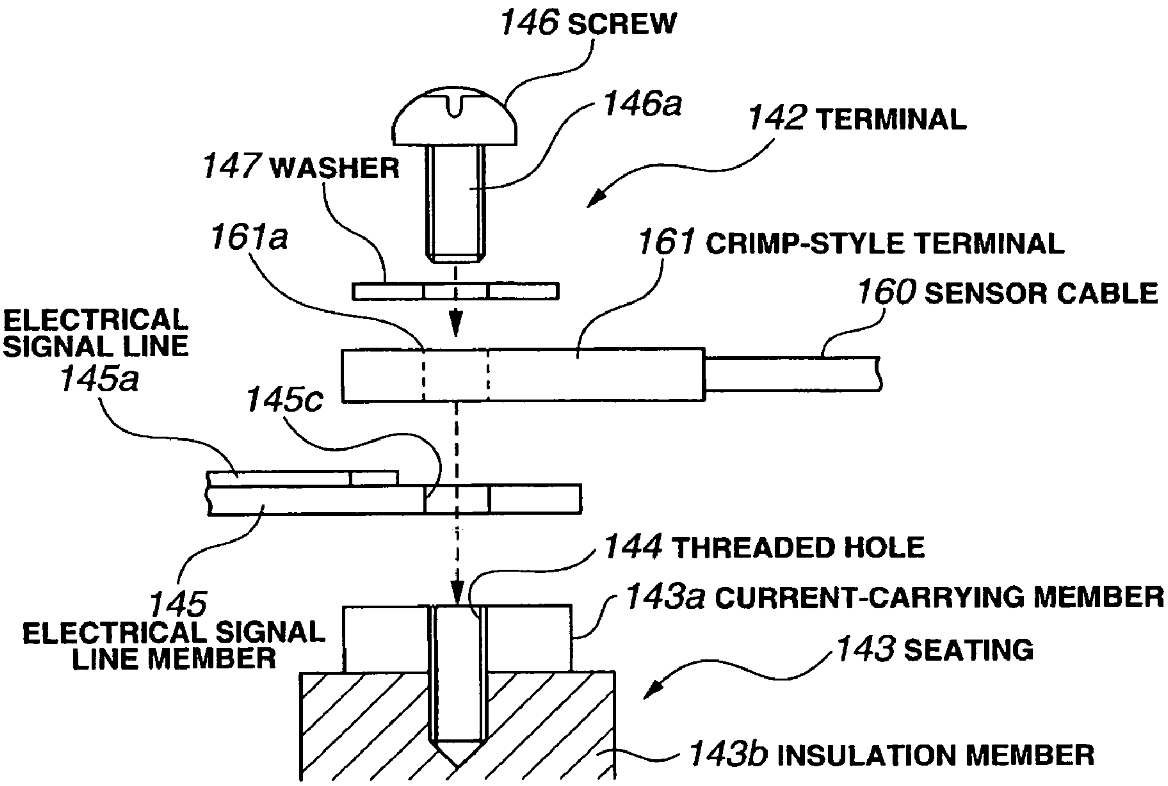
FIG. 9 is a cross-sectional view showing in detail a mode of connection between an electrical signal line member and a terminal.
Figure 10:
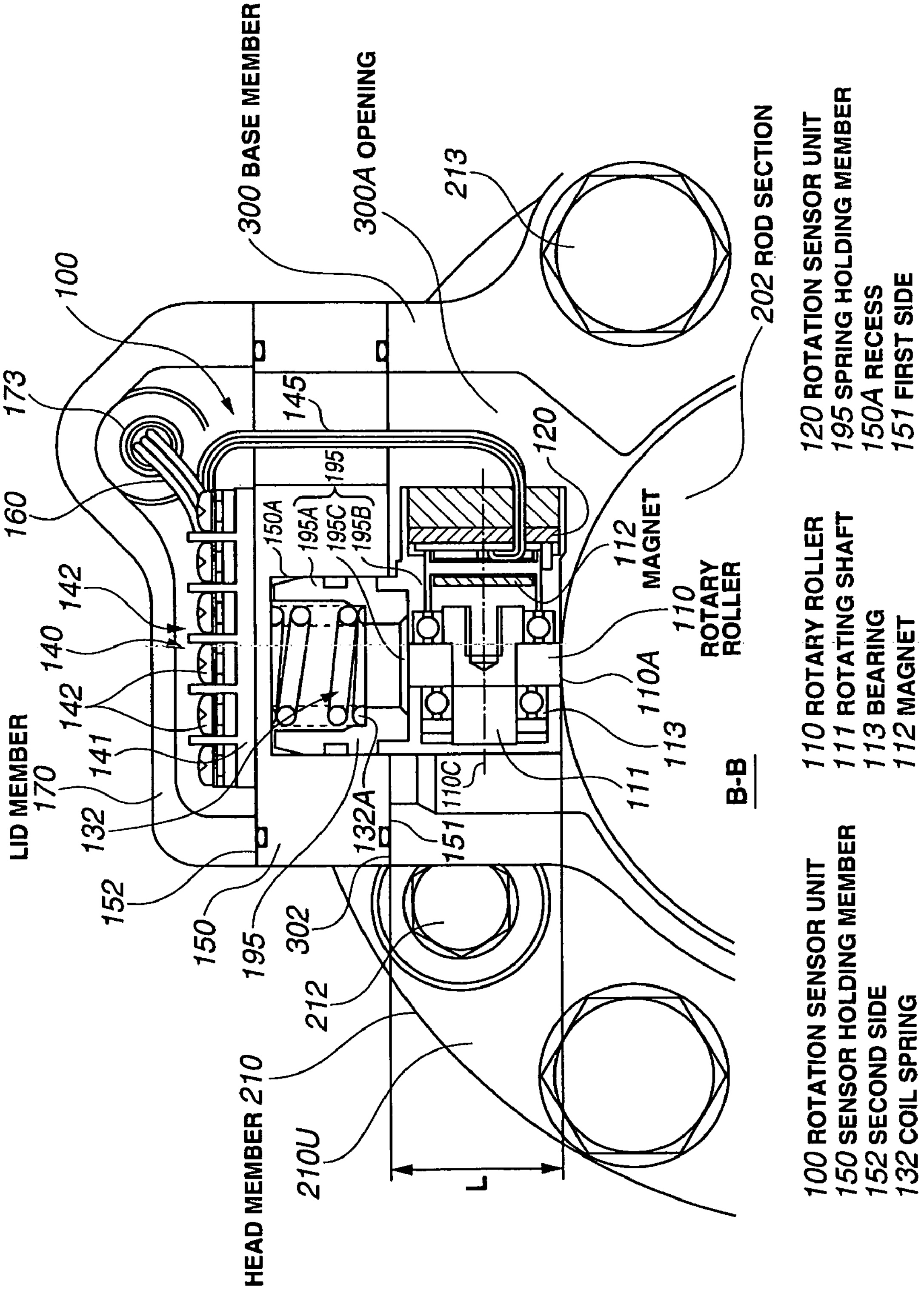
FIG. 10 is a diagram showing a structure of a cylinder stroke position measurement device according to a second exemplary embodiment, as viewed in cross section of a cylinder rod.
Figure 11A:
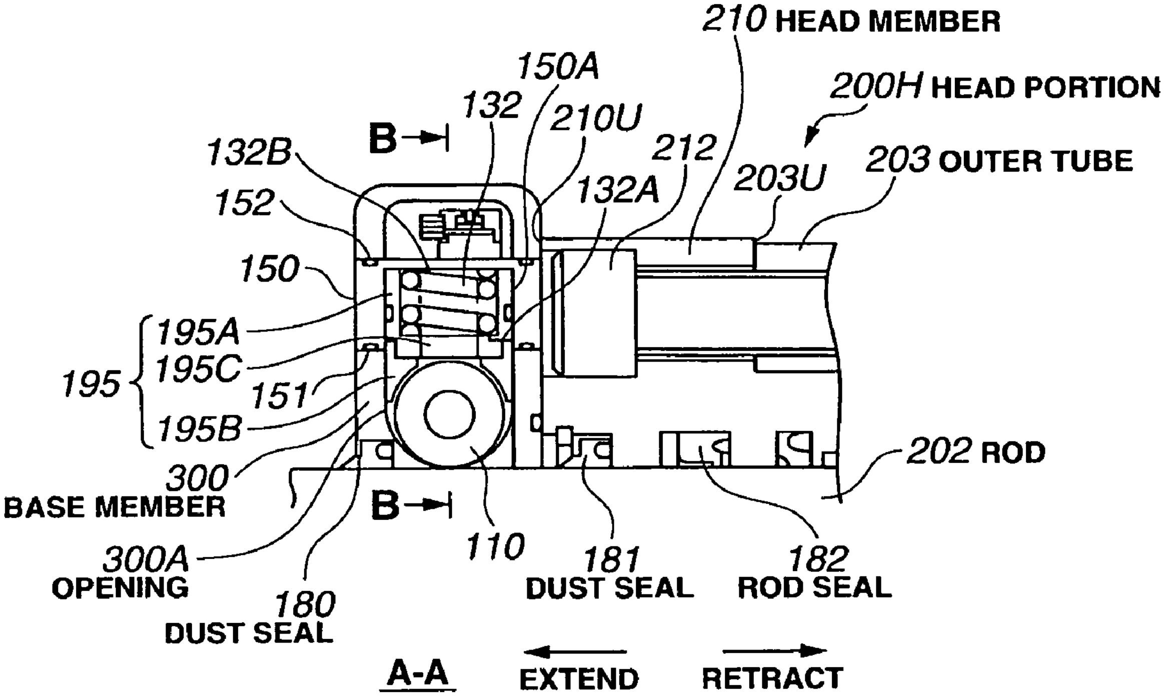
Figure 11B:
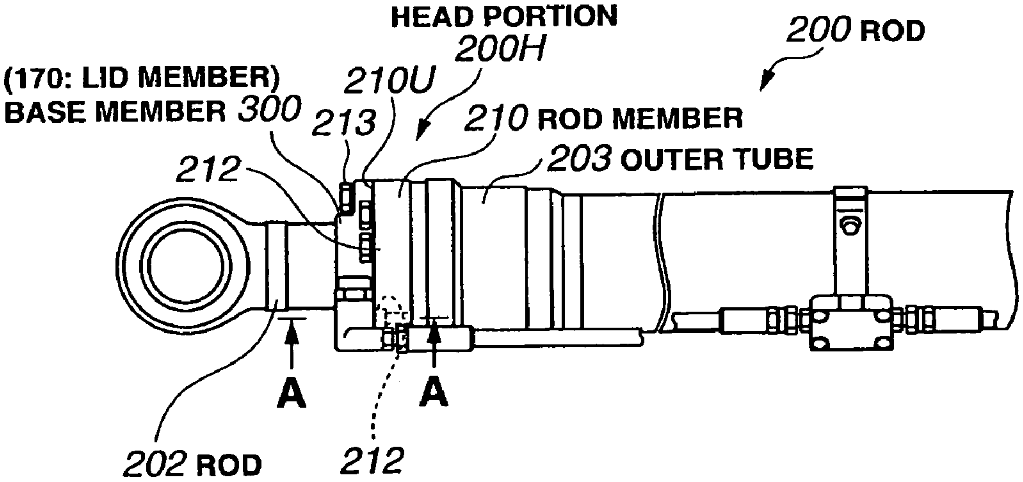
FIG. 11(B) is a diagram showing an external appearance of the cylinder.
Figure 12:
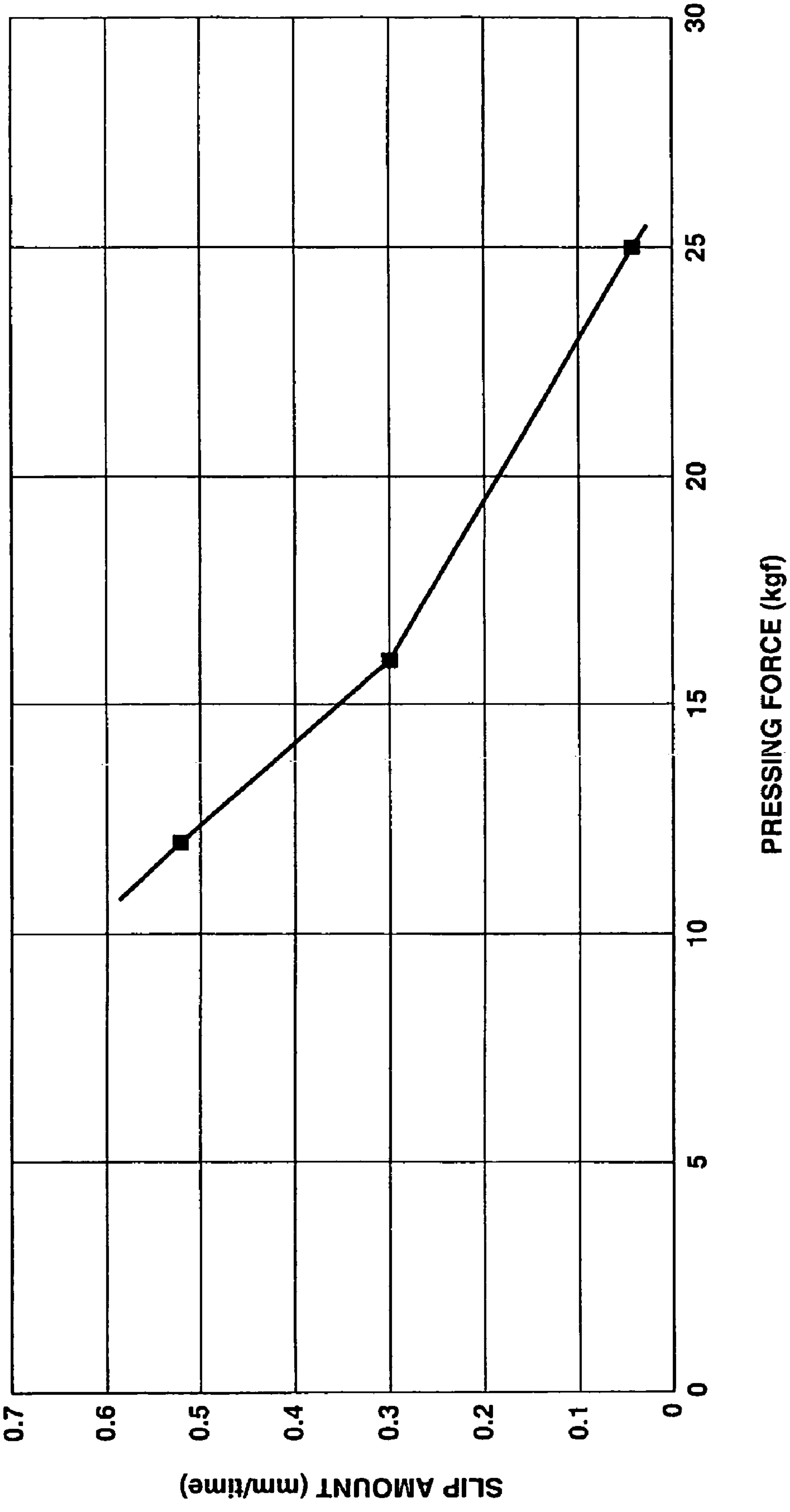
FIG. 12 is a diagram for explaining relation between pressing force and slip amount.

The invention claimed is:

1. A cylinder stroke position measurement device for measuring a stroke position of a cylinder, comprising:

a rotary roller being in contact with a surface of a rod of the cylinder and rotating in accordance with displacement of the rod;

a pressing member pressing the rotary roller against the surface of the rod;

a rotation sensor section detecting an amount of rotation of the rotary roller;

a coupling member electrically coupling the rotation sensor section with an external signal line;

a base member attached to a head portion of the cylinder and having an opening accommodating at least the rotary roller and the rotation sensor section;

a sensor holding member holding the pressing member, the rotary roller, and the rotation sensor section on its one side, and attached to the base member such that the rotary roller and the rotation sensor section are accommodated in the opening of the base member;

the coupling member being arranged on an opposite side of the sensor holding member; and a lid member attached to the sensor holding member so as to cover the coupling member.

2. The cylinder stroke position measurement device as claimed in claim 1, wherein the pressing member is a leaf spring, and the leaf spring is accommodated in a recess formed in the sensor holding member such that the rotary roller is pressed against the surface of the rod in accordance with deflection of the leaf spring.

3. The cylinder stroke position measurement device as claimed in claim 1, wherein the pressing member is a coil spring, and the coil spring is accommodated in a recess formed in the sensor holding member such that the rotary roller is pressed against the surface of the rod in accordance with deflection of the coil spring.

4. A cylinder stroke position measurement device for measuring a stroke position of a cylinder, comprising:

a rotary roller being in contact with a surface of a rod of the cylinder and rotating in accordance with displacement of the rod;

a pressing member pressing the rotary roller against the surface of the rod;

a rotation sensor section detecting an amount of rotation of the rotary roller;

a coupling member electrically coupling the rotation sensor section with an external signal line;

a base member attached to a head portion of the cylinder and having an opening accommodating at least the rotary roller and the rotation sensor section; and a sensor holding member holding the pressing member, the rotary roller, and the rotation sensor section on its one side, and attached to the base member such that the rotary roller and the rotation sensor section are accommodated in the opening of the base member, wherein the base member is provided with dust seals at different positions in a stroke direction of the rod such that the rotary roller is located between the dust seals.

5. The cylinder stroke position measurement device as claimed in claim 4, wherein the pressing member is a leaf spring, and the leaf spring is accommodated in a recess formed in the sensor holding member such that the rotary roller is pressed against the surface of the rod in accordance with deflection of the leaf spring.

6. The cylinder stroke position measurement device as claimed in claim 4, wherein the pressing member is a coil spring, and the coil spring is accommodated in a recess formed in the sensor holding member such that the rotary roller is pressed against the surface of the rod in accordance with deflection of the coil spring.

7. A cylinder stroke position measurement device for measuring a stroke position of a cylinder, comprising:

a rotary roller being in contact with a surface of a rod of the cylinder and rotating in accordance with displacement of the rod;

a pressing member pressing the rotary roller against the surface of the rod;

a rotation sensor section detecting an amount of rotation of the rotary roller;

a coupling member electrically coupling the rotation sensor section with an external signal line;

a base member attached to a head portion of the cylinder and having an opening accommodating at least the rotary roller and the rotation sensor section;

a sensor holding member holding the pressing member, the rotary roller, and the rotation sensor section on its one side, and attached to the base member such that the rotary roller and the rotation sensor section are accommodated in the opening of the base member; and a lever member is provided for rotatably supporting the rotary roller, wherein the opening of the base member is formed with an oblique hole extending from an extension side of the rod to a retraction side of the rod, along a direction from the outer periphery to the inner periphery of the base member; and the lever member is provided with an oblique part corresponding to the oblique hole, the oblique part of the lever member being inserted into the oblique hole.

8. The cylinder stroke position measurement device as claimed in claim 7, wherein the pressing member is a leaf spring, and the leaf spring is accommodated in a recess formed in the sensor holding member such that the rotary roller is pressed against the surface of the rod in accordance with deflection of the leaf spring.

9. The cylinder stroke position measurement device as claimed in claim 7, wherein the pressing member is a coil spring, and the coil spring is accommodated in a recess formed in the sensor holding member such that the rotary roller is pressed against the surface of the rod in accordance with deflection of the coil spring.

* * * * *